(12) United States Patent
Hsu et al.

(10) Patent No.: US 12,031,570 B2
(45) Date of Patent: Jul. 9, 2024

(54) HINGE

(71) Applicant: FOSITEK CORPORATION, New Taipei (TW)

(72) Inventors: An-Szu Hsu, New Taipei (TW); An-Wei Chung, Kaohsiung (TW)

(73) Assignee: FOSITEK CORPORATION, New Taipei (TW)

( * ) Notice: Subject to any disclaimer, the term of this patent is extended or adjusted under 35 U.S.C. 154(b) by 64 days.

(21) Appl. No.: 18/150,940

(22) Filed: Jan. 6, 2023

(65) Prior Publication Data
US 2024/0175463 A1 May 30, 2024

(30) Foreign Application Priority Data
Nov. 28, 2022 (TW) .................................. 111145400

(51) Int. Cl.
| | |
|---|---|
| *E05D 3/06* | (2006.01) |
| *F16C 11/04* | (2006.01) |
| *G06F 1/16* | (2006.01) |
| *E05D 3/12* | (2006.01) |
| *E05D 3/18* | (2006.01) |

(52) U.S. Cl.
CPC ............ *F16C 11/04* (2013.01); *G06F 1/1681* (2013.01); *E05D 3/122* (2013.01); *E05D 3/18* (2013.01); *E05Y 2999/00* (2024.05)

(58) Field of Classification Search
CPC ...... G06F 1/168; G06F 1/1681; G06F 1/1616; G06F 1/1652; E05Y 2900/602; E05Y 2900/606; E05Y 2800/205; E05Y 2800/20; E05Y 2800/242; E05Y 2999/00; H04M 1/022; H04M 1/0214; H04M 1/0216; E05D 3/12; E05D 3/122; E05D 3/14; E05D 3/16; E05D 3/18; E05D 3/06; E05D 11/06; E05D 1/00; E05D 1/02; E05D 1/04; E05D 7/00; F16C 11/04; F16C 11/12
See application file for complete search history.

(56) References Cited

U.S. PATENT DOCUMENTS

| | | | |
|---|---|---|---|
| 11,907,027 B2* | 2/2024 | Torres | ........................ E05D 3/06 |
| 2021/0271294 A1* | 9/2021 | Liao | ....................... G06F 1/1681 |
| 2022/0086265 A1* | 3/2022 | Shang | ................... G06F 1/1652 |
| 2023/0021638 A1* | 1/2023 | Yun | ......................... F16C 11/04 |

(Continued)

*Primary Examiner* — Chuck Y Mah
(74) *Attorney, Agent, or Firm* — Birch, Stewart, Kolasch & Birch, LLP

(57) ABSTRACT

A hinge is connectable with two housing shells for permitting relative folding and unfolding of the housing shells, and includes a fixed seat, at least two rotating units, two lateral support plates and at least one synchronous driving unit. The rotating units are shiftable between an open state and a closed state. Each rotating unit includes a linking member fittingly and arcuately slidable on the fixed seat, a sliding member fittingly and arcuately slidable on the linking member, and a rotary bracket pivotably mounted on the fixed seat and inclinedly slidable on the sliding member. The lateral support plates are respectively mounted on the linking members. The synchronous driving unit includes two inboard pinions and two outboard pinions arranged laterally to mesh with bracket toothed portions of the rotary brackets to make synchronous rotation of the rotary brackets in opposite rotational directions.

6 Claims, 8 Drawing Sheets

(56) References Cited

U.S. PATENT DOCUMENTS

| | | | |
|---|---|---|---|
| 2023/0103700 A1* | 4/2023 | Park | G06F 1/1652 |
| | | | 361/679.01 |
| 2023/0151656 A1* | 5/2023 | Yang | E05D 3/18 |
| | | | 360/266.6 |
| 2023/0279898 A1* | 9/2023 | Liu | F16C 11/04 |
| | | | 361/807 |
| 2023/0366248 A1* | 11/2023 | Chung | G06F 1/1681 |
| 2023/0409077 A1* | 12/2023 | Kim | G06F 1/1652 |
| 2024/0036607 A1* | 2/2024 | Yen | G06F 1/1681 |
| 2024/0056517 A1* | 2/2024 | Cheng | H04M 1/0216 |

* cited by examiner

HINGE

CROSS-REFERENCE TO RELATED APPLICATION

This application claims priority to Taiwanese Invention Patent Application No. 111145400, filed on Nov. 28, 2022.

FIELD

The disclosure relates to a hinge, and more particularly to a hinge having two lateral support plates for supporting a flexible display of a flexible electronic device.

BACKGROUND

A conventional hinge has a fixed seat, two rotating units, two lateral support plates and a synchronous driving unit. The two rotating units are disposed on the fixed seat and are shiftable between an open state and a closed state. Each rotating unit includes a rotary bracket rotatably mounted on the fixed seat. The two lateral support plates are disposed on and are moved with the rotating units, respectively. In the open state, the lateral support plates are juxtaposed to conceal the fixed seat. The synchronous driving unit has two pinions connected between the rotary brackets of the rotating units to make synchronous rotation of the rotating units in opposite rotational directions.

However, such hinge has a thickness that depends on the outer diameter of the pinions. Also, since the rotary brackets of the rotating units have rotating centers disposed in a receiving space defined by the fixed seat, and since a gap is formed between the fixed seat and the respective lateral support plate to permit outward extension of the corresponding rotary bracket therefrom, at least one of the fixed seat, the two rotating units and the two lateral support plates must have a thinned structure to prevent interference of the rotary brackets with at least one of the fixed seat and the lateral support plates when shifting between the open state and the closed state, which reduces the structural strength and makes the outer appearance of the hinge unattractive.

SUMMARY

Therefore, an object of the disclosure is to provide a hinge that can alleviate at least one of the drawbacks of the prior art.

According to the disclosure, the hinge is connectable with two housing shells for permitting relative folding and unfolding of the housing shells, and includes a fixed seat, at least two rotating units, two lateral support plates and at least one synchronous driving unit. The fixed seat extends in a front-rear direction and has two elongated sides which extend in the front-rear direction and which are opposite to each other in a left-right direction, and two first guideways which are disposed at two sides of a centerline between the two elongated sides, respectively, and which are arcuate. The rotating units are disposed at the two sides of the centerline adjacent to the first guideways, respectively, and are connectable with the housing shells, respectively. The rotating units are shiftable between an open state and a closed state. Each of the rotating units includes a linking member, a sliding member and a rotary bracket. The linking member has a linking body, a first arcuate key which is disposed on the linking body to be fittingly slidable on a respective one of the first guideway, and a second arcuate key which is disposed on the linking body and which extends in the left-right direction away from the fixed seat. The linking body has a plate supporting surface which faces upwardly. The sliding member has a sliding body, a second guideway which is disposed on the sliding body and which is arcuate for the second arcuate key to be fittingly slidable on the second guideway, and an inclined sliding portion which is disposed on the sliding body opposite to the second guideway in the front-rear direction. The sliding body has a shell supporting surface on which a respective one of the housing shells is disposed, and which faces upwardly. The rotary bracket is pivotably mounted on the fixed seat, and has a bracket body and an inclined guiding portion which is disposed on the bracket body and which is fittingly movable on the inclined sliding portion. The bracket body has a bracket toothed portion which is disposed opposite to the inclined guiding portion in the left-right direction. During shifting of the rotating units from the open state to the closed state, the sliding member is slided relative to the second arcuate key and the inclined guiding portion, and is rotated relative to the fixed seat. The two lateral support plates respectively have two inboard plate edges each extending in the front-rear direction, and two support walls extending in the left-right direction from a respective one of the inboard plate edges to terminate at two outboard plate edges, respectively. The support walls are respectively mounted on the plate supporting surfaces of the linking members of the rotating units to be moved with the linking members. The synchronous driving unit includes two inboard pinions which are disposed proximal to the centerline, and two outboard pinions which are disposed distal from the centerline. The inboard pinions and the outboard pinions are arranged in the front-rear direction to mesh with the bracket toothed portions of the rotary brackets and be connected between the rotating units to make synchronous rotation of the rotary brackets in opposite rotational directions. In the open state, the lateral support plates are juxtaposed to conceal the fixed seat in an up-down direction. In the closed state, the lateral support plates are brought into an upright position and face each other in the left-right direction, and a distance between the inboard plate edges of the lateral support plates is larger than a distance between the outboard plate edges of the lateral support plates.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
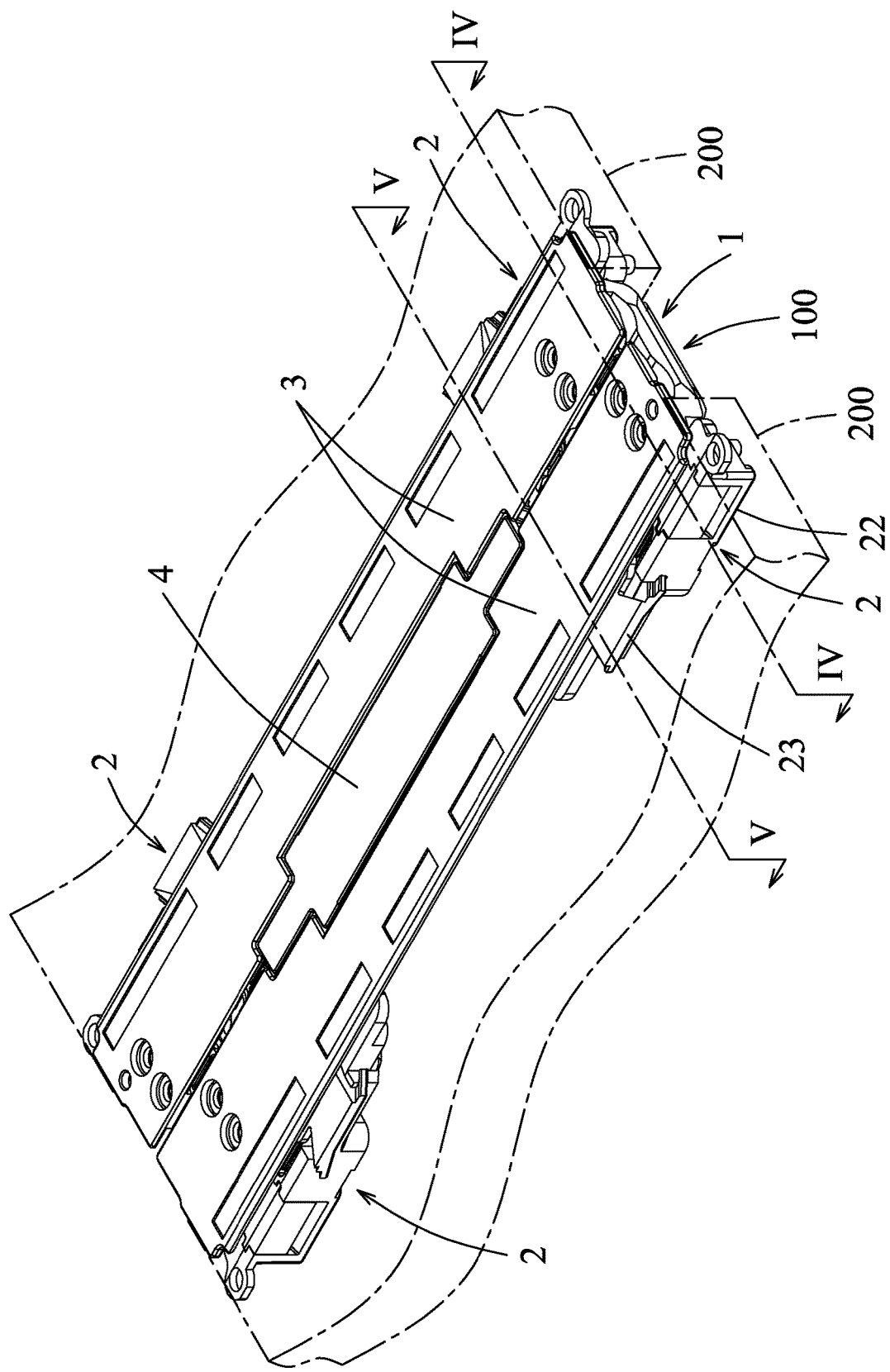
FIG. 1 is a perspective view illustrating an embodiment of a hinge according to the disclosure in an open state.

It should be noted herein that for clarity of description, spatially relative terms such as "top," "bottom," "upper,"

"lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, an embodiment of a hinge 100 according to the disclosure is connectable with two housing shells 200 of a flexible electronic device (not shown) for permitting relative folding and unfolding of the housing shells 200, and for supporting a flexible display 300. The hinge 100 includes a fixed seat 1, two pairs of rotating units 2, two lateral support plates 3, a center support plate 4, two synchronous driving units 5 and two torque transmitting mechanisms 6.

The fixed seat 1 includes a fixed frame 11 which extends in a front-rear direction and which has two elongated sides 112 opposite to each other in a left-right direction, a seat housing (not shown) which is disposed under the fixed frame 11, and two rail frames 12 which are securely mounted on and located above the fixed frame 11 and which are opposite to each other in the front-rear direction. The fixed frame 11 defines a receiving space 111 between the rail frames 12, and a centerline (C) between the two elongated sides 112 and parallel to the elongated sides 112. Each of the rail frames 12 is formed with two first guideways 121 which are disposed at two sides of the centerline (C), respectively, and which are arcuate.

Figure 6:
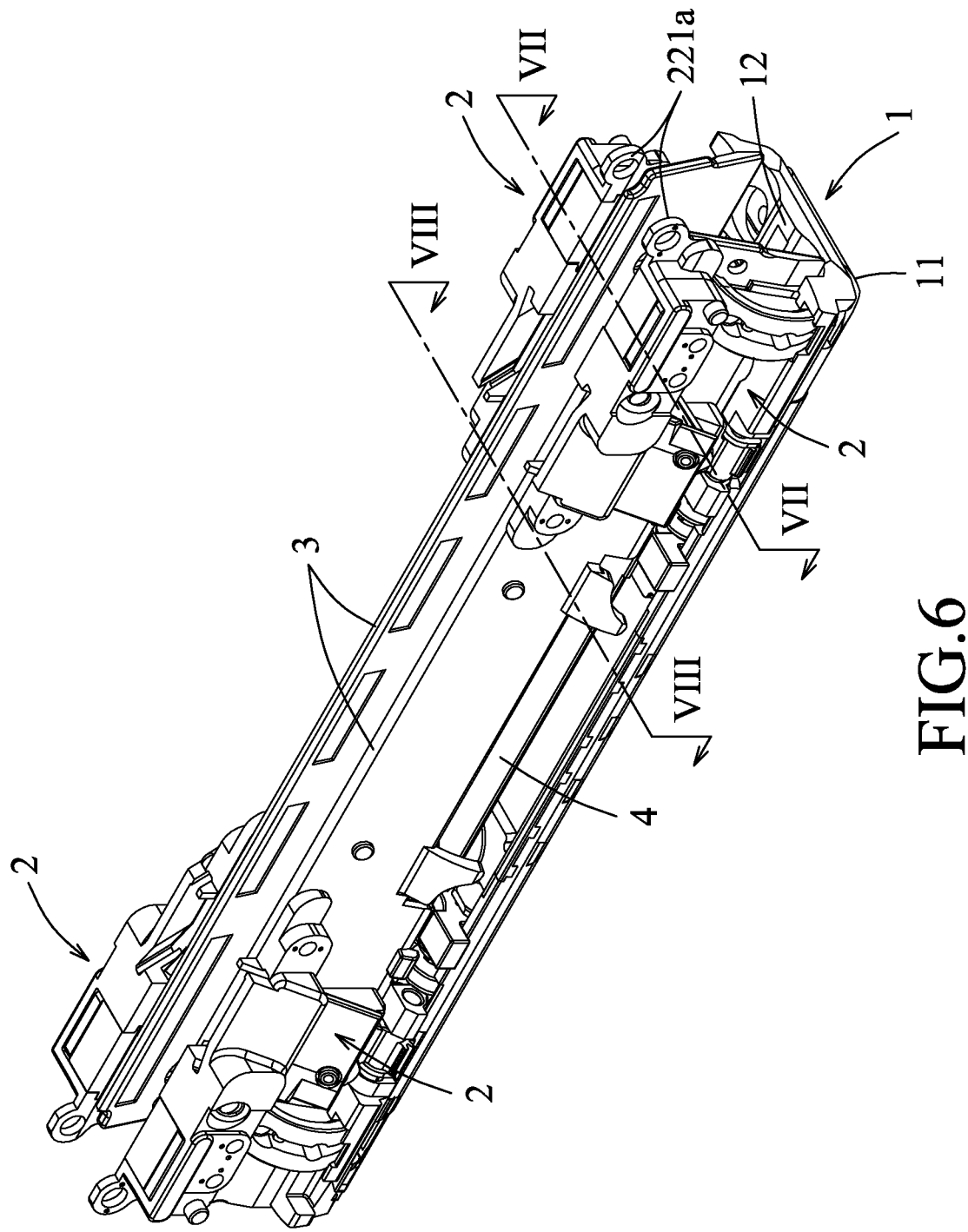
FIG. 6 is a perspective view of the embodiment in a closed state.

The rotating units 2 of each pair are disposed on the respective rail frame 12 at the two sides of the centerline (C), and are adjacent to the first guideways 121, respectively. The rotating units 2 of each pair are connectable with the housing shells 200, respectively. The rotating units 2 are shiftable between an open state (as shown in FIG. 1) and a closed state (as shown in FIG. 6). Each rotating unit 2 includes a linking member 21, a sliding member 22, a rotary bracket 23 and an auxiliary shaft member 24.

The linking member 21 has a linking body 211, a first arcuate key 212 which is disposed on the linking body 211 to be fittingly slidable on the corresponding first guideway 121, and a second arcuate key 213 which is disposed on the linking body 211 and which extends in the left-right direction away from the fixed seat 1. The linking body 211 has a plate supporting surface (211a) which faces upwardly.

The sliding member 22 has a sliding body 221, a second guideway 222 which is formed on the sliding body 221 and which is arcuate for the second arcuate key 213 to be fittingly slidable on the second guideway 222, and an inclined sliding portion 223 which is formed on the sliding body 221 opposite to the second guideway 222 in the front-rear direction. The sliding body 221 has a shell supporting surface (221a) on which a respective one of the housing shells 200 is disposed, and which faces upwardly. In the embodiment, the inclined sliding portion 223 is in the form of a recessed duct and is inclined relative to the shell supporting surface (221a).

With reference to FIGS. 2 to 5, the rotary bracket 23 is pivotably mounted on the fixed seat 1. The rotary bracket 23 has a bracket body 231, an inclined guiding portion 232 which is formed on the bracket body 231 and which is fittingly movable on the inclined sliding portion 223, and a rivet 233 which is disposed on the bracket body 231. The bracket body 231 has a pivot shaft (231a) which is disposed opposite to the inclined guiding portion 232 in the left-right direction and which is pivotably mounted on the corresponding rail frame 12 of the fixed seat 1, and a bracket toothed portion (231b) which is formed on the pivot shaft (231a).

During shifting of the rotating units 2 from the open state to the closed state, the sliding member 22 is slided relative to the second arcuate key 213 and the inclined guiding portion 232, and is rotated relative to the fixed seat 1. In the embodiment, the inclined guiding portion 232 is in the form of a sliding block. The pivot shaft (231a) is pivotally disposed on the fixed seat 1 such that the rotary bracket 23 is rotated about a rotating center (CR1) in the pivot shaft (231a).

The auxiliary shaft member 24 is inclined along the extending direction of the inclined sliding portion 223 and is pivotally disposed on the sliding member 22. The rivet 233 of the rotary bracket 23 is slidably engaged in a slot 241 of the auxiliary shaft member 24 to stabilize the sliding movement of the sliding member 22 relative to the inclined guiding portion 232.

The two lateral support plates 3 respectively have two inboard plate edges 30 each extending in the front-rear direction, and two support walls 33 extending in the left-right direction from a respective one of the inboard plate edges 30 to terminate at two outboard plate edges 34, respectively. The support walls 33 are respectively mounted on the plate supporting surfaces (211a) of the linking members 21 of the rotating units 2 to be moved with the linking members 21. The inboard plate edges 30 are configured to define a central notch therebetween. Each lateral support plate 3 has a plurality of raising portions 31 and a plurality of bracing portions 32 each projecting into the central notch. The center support plate 4 is disposed to cover the central notch, and is mounted on the fixed frame 11 of the fixed seat 1 by means of two screw fasteners 7. Each of two spring members 8 is disposed between a head portion of each screw fastener 7 and the fixed frame 11 to bias the center support plate 4 downwardly relative to the fixed frame 11. The center support plate 4 is raised by the raising portions 31 and is supported by the bracing portions 32 to be kept at the same height position. Alternatively, the lateral support plates 3 may be configured to not have the central notch therebetween and thus the center support plate 4 is dispensed therewith.

The two synchronous driving units 5 are respectively disposed on the rail frames 12 adjacent to the two pairs of the rotating units 2. Each synchronous driving unit 5 includes two inboard pinions 51 which are disposed proximal to the centerline (C), and two outboard pinions 52 which are disposed distal from the centerline (C). Each inboard pinion 51 is integrally formed with an inboard pinion axle 511 which is rotatably disposed on the corresponding rail frame 12 such that the inboard pinion 51 is rotatable about a rotating center (CR2). Each outboard pinion 52 is sleeved on an outboard pinion axle 53 and is rotatably disposed on the corresponding rail frame 12 through the outboard pinion axle 53 such that the outboard pinion 52 is rotatable about a rotating center (CR3). The inboard pinions 51 and the outboard pinions 52 are arranged in the front-rear direction to mesh with the bracket toothed portions (231b) of the rotary brackets 23 and be connected between the rotating units 2 to make synchronous rotation of the rotary brackets 23 in opposite rotational directions.

The rotating centers (CR2) of the inboard pinions 51 and the rotating centers (CR3) of the outboard pinions 52 are located in the receiving space 111. The rotating centers (CR1) of the rotary brackets 23 are located outwardly of the receiving space 111 and higher than the receiving space 111. The rotating centers (CR1) of the rotary brackets 23 are located outboard of rotating centers (CR3) of the outboard pinions 52 in the left-right direction.

With reference to FIGS. 2 to 5, in the open state, the lateral support plates 3 and the center support plate 4 are juxtaposed to conceal the fixed seat 1 in an up-down direction. In this state, the rotating center (CR1) of each rotary bracket 23 is closer to the corresponding lateral support plate 3 than the rotating center (CR2) of each inboard pinion 51 and the rotating center (CR3) of each outboard pinion 52, and the rotating centers (CR1) of the rotating brackets 23 are located between the lateral support plates 3 and the fixed frame 11 in the up-down direction. Also, in this state, the shell supporting surfaces (221a) of the sliding members 22 are parallel to the plate supporting surfaces (211a) of the linking members 21. Thus, the two housing shells 200 which are disposed on the shell supporting surfaces (221a) of the sliding members 22, and the two lateral support plates 3 which are disposed on the plate supporting surfaces (211a) of the linking members 21 have upwardly facing surfaces with the same height to support the flexible display 300. Moreover, in the open state, the raising portions 31 and the bracing portions 32 of the lateral support plates 3 raise and support the center support plate 4 to keep the center support plate 4 at the same height position as that of the lateral support plates 3 so that the flexible display 300 is provided with further support.

Figure 7:
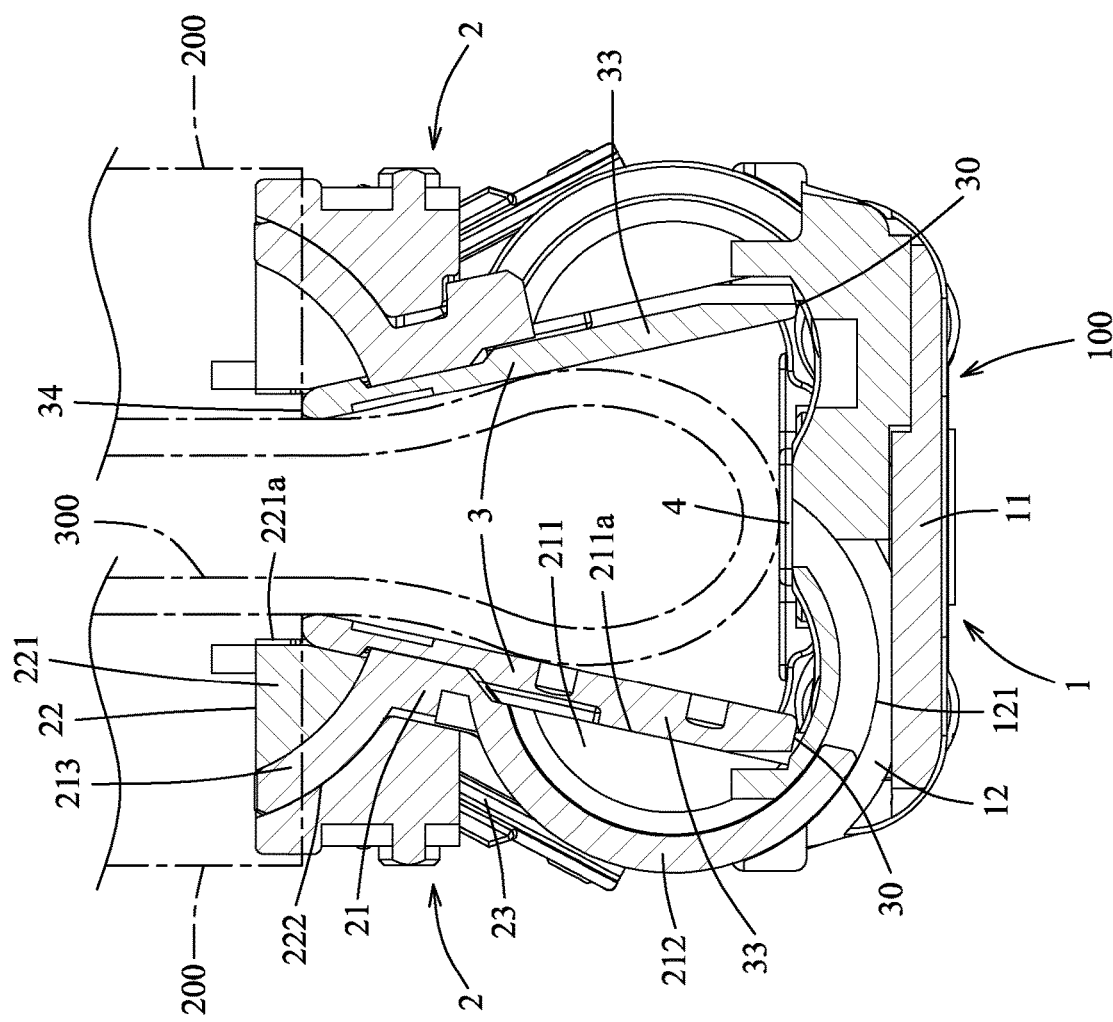
FIG. 7 is a sectional view taken along line VII-VII of FIG. 6.
Figure 8:
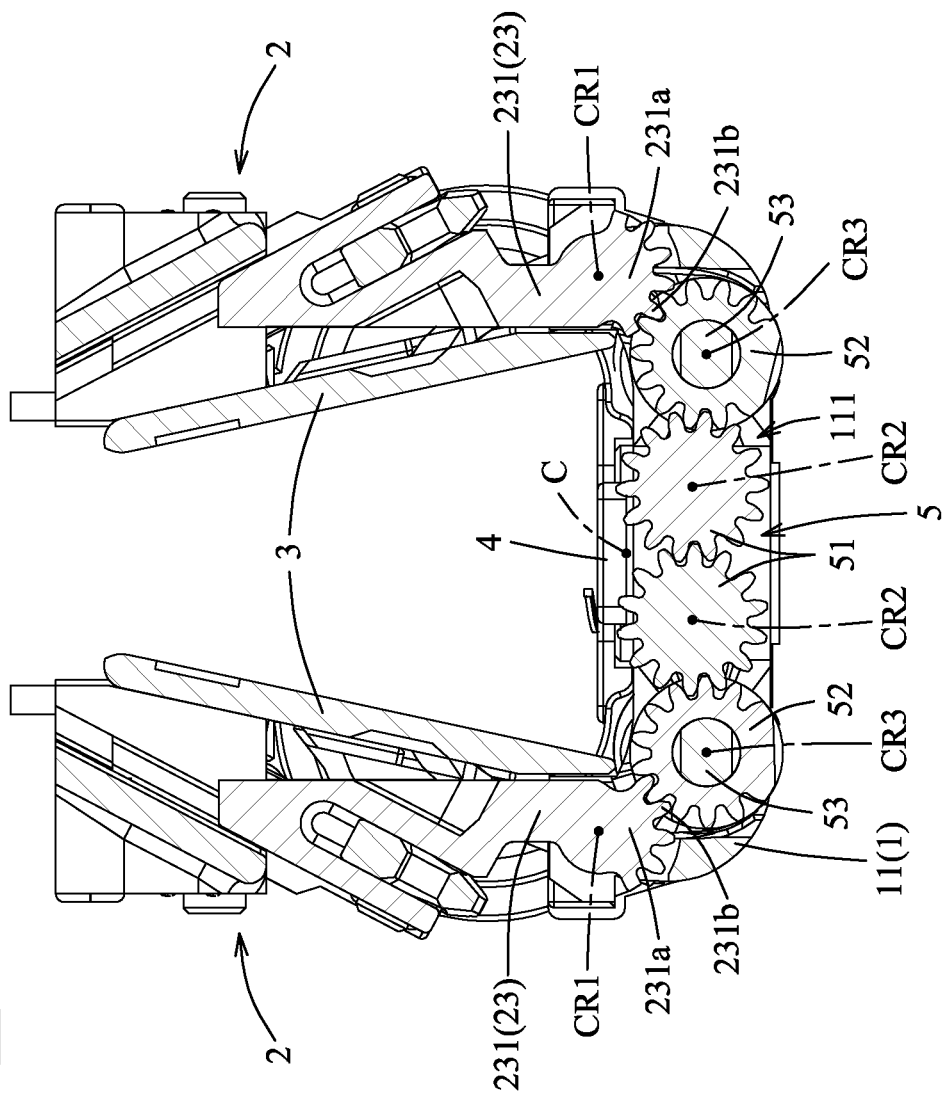
FIG. 8 is a sectional view taken along line VIII-VIII of FIG. 6.

With reference to FIGS. 6 to 8, in the closed state, the lateral support plates 3 are brought in an upright position and face each other in the left-right direction. Also, a distance between the inboard plate edges 30 of the lateral support plates 3 is larger than a distance between the outboard plate edges 34 of the lateral support plates 3. The shell supporting surfaces (221a) of the sliding members 22 are disposed parallel to each other and opposite to each other in the left-right direction. Specifically, the lateral support plates 3 are moved with the linking members 21, and the support walls 33 of the lateral support plates 3 are respectively parallel to the plate supporting surfaces (211a) of the linking members 21. During the shifting of the linking members 21 from the open state to the closed state, the first arcuate keys 212 are slided along the corresponding first guideways 121. In the closed state, as shown in FIG. 7, the plate supporting surfaces (211a) of the linking members 21 are inclined relative to the up-down direction to be closer to each other at distal sides from the fixed seat 1 such that the distances between the plate supporting surfaces (211a) are gradually increased from the distal sides to the proximal sides. Hence, the distance between the inboard plate edges 30 of the lateral support plates 3 is larger than the distance between the outboard plate edges 34 of the lateral support plates 3. Moreover, the center support plate 4 from which the bracing portions 32 (see FIG. 5) are removed in this state is biased by the spring members 8 to be moved downwardly. A leeway space is provided among the center support plate 4 and the lateral support plates 3 for accommodating the bending portion of the flexible display 300. It is noted that, during the shifting from the closed state to the open state, the center support plate 4 is raised by the raising portions 31 (see FIG. 5) of the lateral support plates 3 and is supported by the raising portions 31 and the bracing portions 32 (see FIG. 5) so that the center support plate 4 is kept at the desired height position.

During the shifting of each rotating unit 2 from the open state to the closed state, the sliding member 22 is slided relative to the second arcuate key 213 and the inclined guiding portion 232, and is rotated relative to the fixed seat 1. With the sliding member 22 slidable arcuately and inclinedly, the shell supporting surfaces (221a) of the sliding members 22 are brought to be parallel to each other and opposite to each other in the left-right direction in the closed state so as to superimpose the housing shells 200 to each other in parallel.

Figure 2:
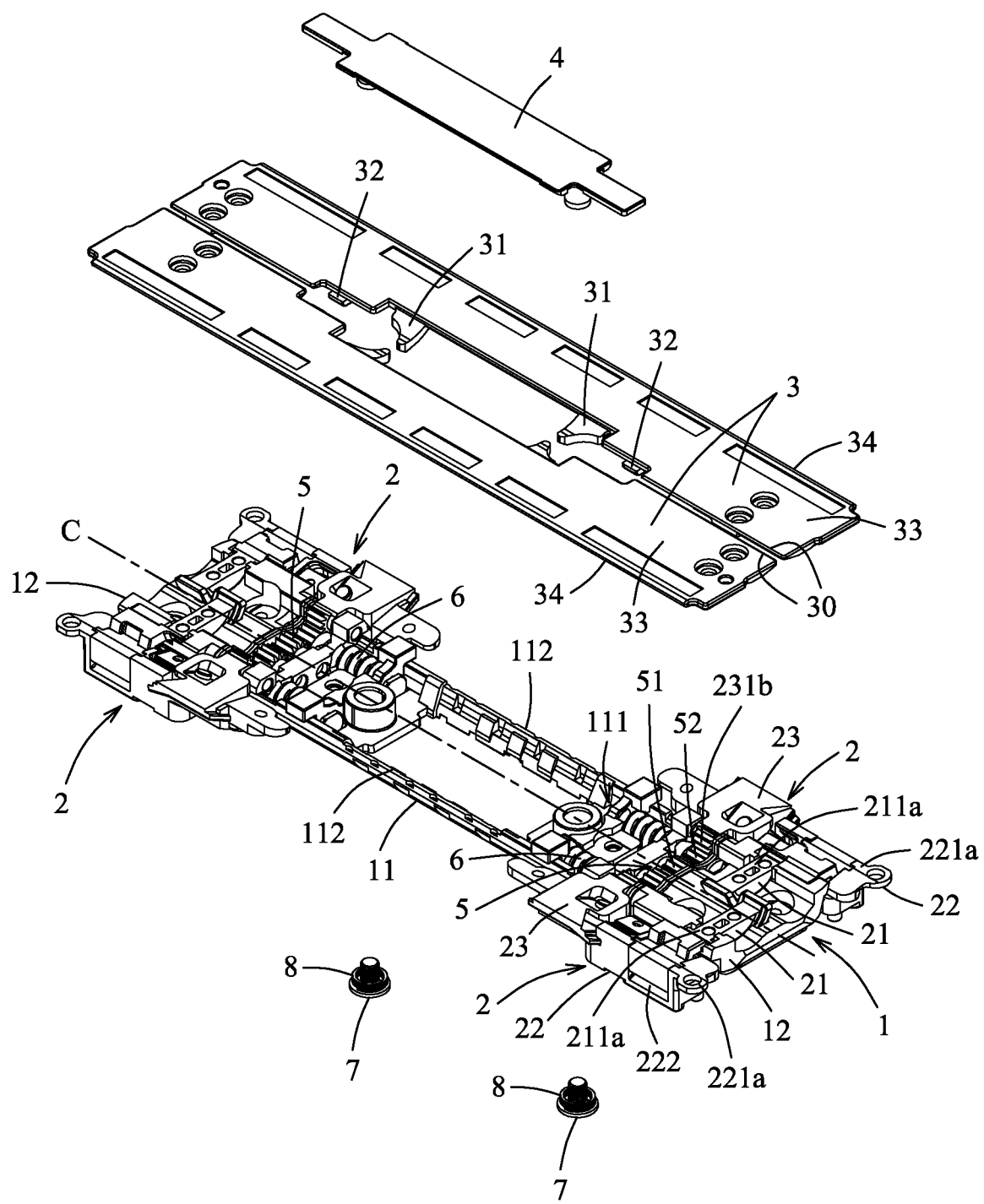
FIG. 2 is an exploded perspective view of the embodiment.
Figure 3:
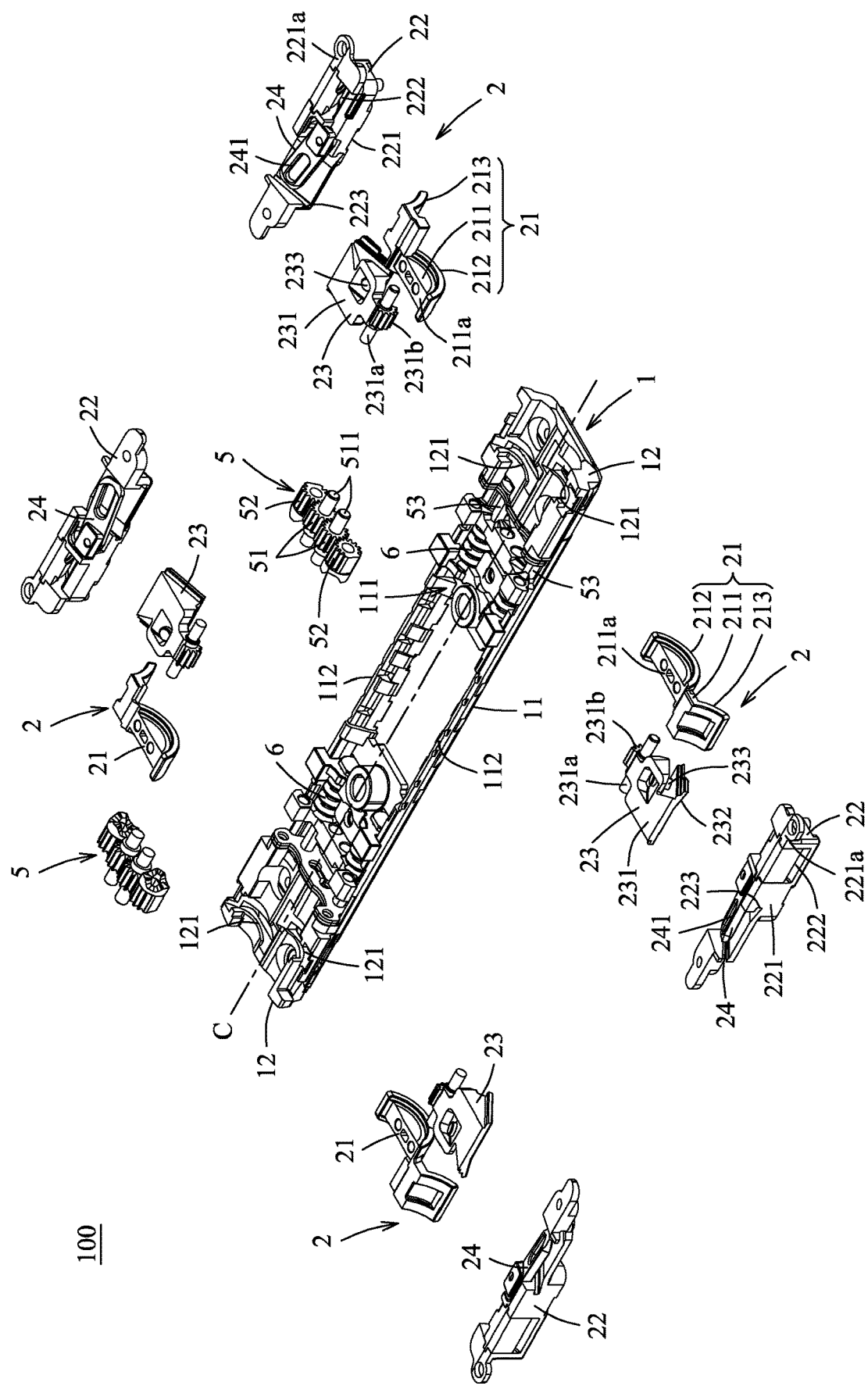
FIG. 3 is an exploded perspective view of a portion of the embodiment.
Figure 4:
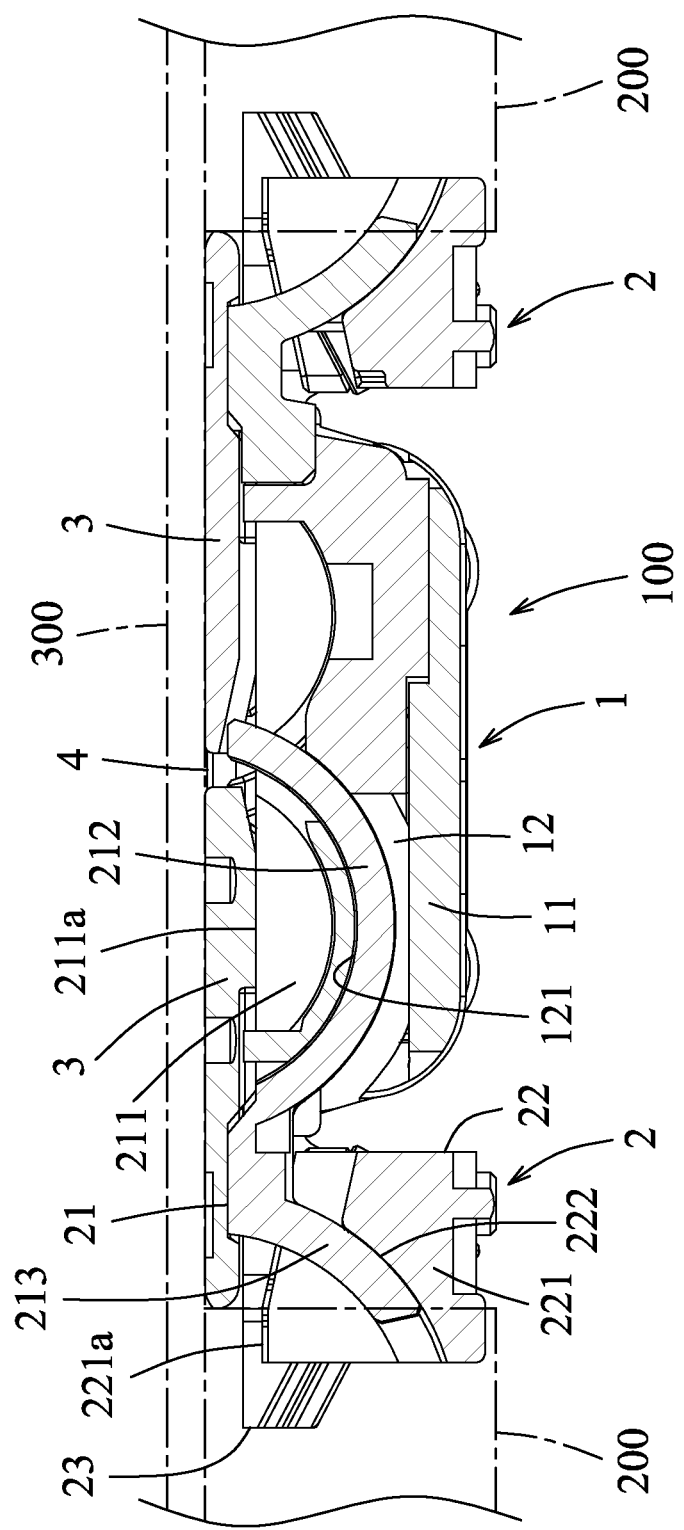
FIG. 4 is a sectional view taken along line IV-IV of FIG. 1.
Figure 5:
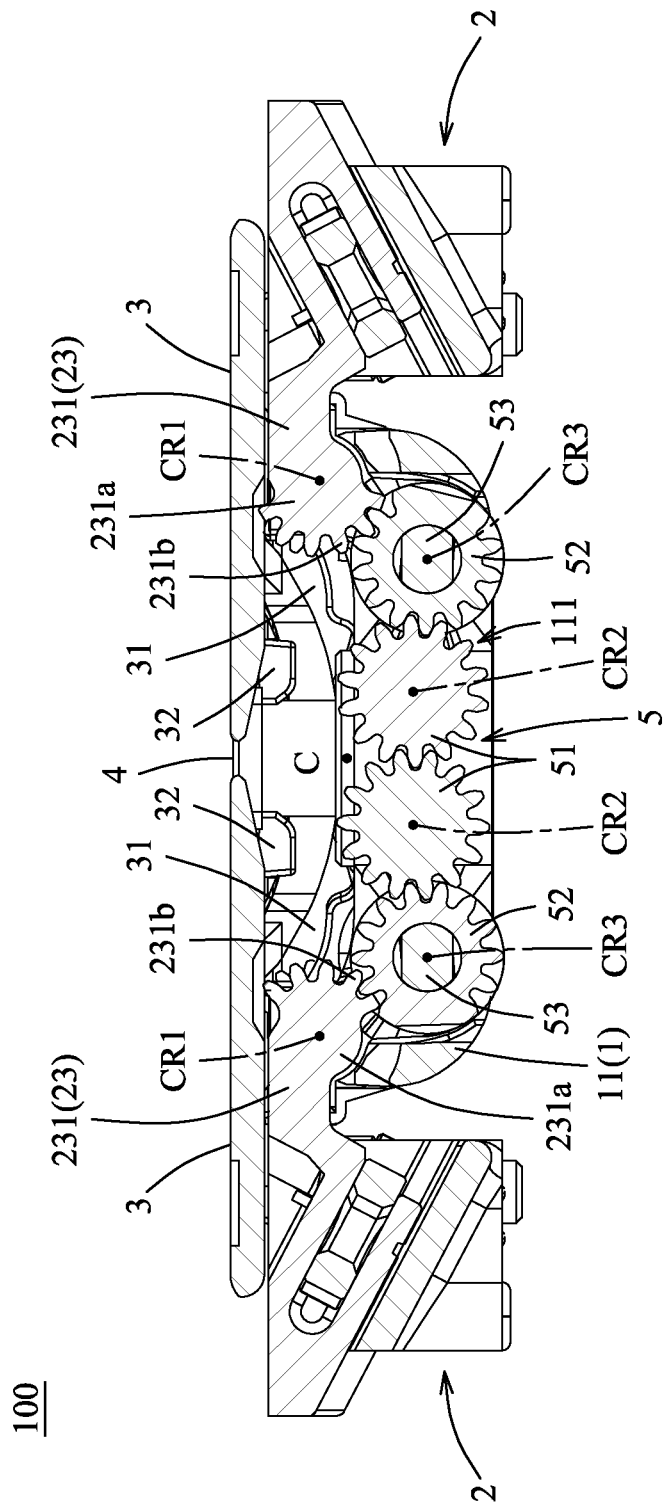
FIG. 5 is a sectional view taken along line V-V of FIG. 1.

With reference to FIGS. 2 and 3, in this embodiment, the torque transmitting mechanisms 6 are received in the receiving space 111 of the fixed frame 11 of the fixed seat 1, and each connected with the synchronous driving units 5 so as to provide a friction al torque to retain the rotating units 2 at any desired angular position.

As illustrated, the inboard pinions 51 and the outboard pinions 52 which are arranged in the front-rear direction to mesh with the bracket toothed portions (231b) of the rotary brackets 23 and be connected between the rotating units 2 have a relatively small outer diameter that can be received in a smaller receiving space. This allows the hinge 100 to be made thinner. Moreover, with the rotating center (CR1) of each rotary bracket 23 located closer to the lateral support plate 3 and outwardly of the receiving space 111, interference of the rotary brackets 23 with the fixed seat 1 and/or the lateral support plates 3 during the shifting between the open state and the closed state is avoided, and the size of the seat and plates structures will need not be reduced, which may reduce the structural strength of the hinge and the make the outer appearance of the hinge unsightly.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge connectable with two housing shells for permitting relative folding and unfolding of the housing shells, comprising:
   a fixed seat extending in a front-rear direction and having two elongated sides which extend in the front-rear direction and which are opposite to each other in a left-right direction, and two first guideways which are disposed at two sides of a centerline between said two elongated sides, respectively, and which are arcuate;
   at least two rotating units disposed at said two sides of said centerline adjacent to said first guideways, respectively, and connectable with the housing shells, respectively, said rotating units being shiftable between an open state and a closed state, each of said rotating units including
   a linking member having a linking body, a first arcuate key which is disposed on said linking body to be fittingly slidable on a respective one of said first guideway, and a second arcuate key which is disposed on said linking body and which extends in the left-right direction away from said fixed seat, said linking body having a plate supporting surface which faces upwardly,
   a sliding member having a sliding body, a second guideway which is disposed on said sliding body and which is arcuate for said second arcuate key to be fittingly slidable on said second guideway, and an inclined sliding portion which is disposed on said sliding body opposite to said second guideway in the front-rear direction, said sliding body having a shell supporting surface on which a respective one of the housing shells is disposed, and which faces upwardly, and
   a rotary bracket pivotably mounted on said fixed seat, and having a bracket body and an inclined guiding portion which is disposed on said bracket body and which is fittingly movable on said inclined sliding portion, said bracket body having a bracket toothed portion which is disposed opposite to said inclined guiding portion in the left-right direction, wherein, during shifting of said rotating units from the open state to the closed state, said sliding member is slid relative to said second arcuate key and said inclined guiding portion and is rotated relative to said fixed seat;

two lateral support plates respectively having two inboard plate edges each extending in the front-rear direction, and two support walls extending in the left-right direction from a respective one of said inboard plate edges to terminate at two outboard plate edges, respectively, said support walls being respectively mounted on said plate supporting surfaces of said linking members of said rotating units to be moved with said linking members; and at least one synchronous driving unit including two inboard pinions which are disposed proximal to the centerline, and two outboard pinions which are disposed distal from the centerline, said inboard pinions and said outboard pinions being arranged in the front-rear direction to mesh with said bracket toothed portions of said rotary brackets and be connected between said rotating units to make synchronous rotation of said rotary brackets in opposite rotational directions, wherein, in the open state, said lateral support plates are juxtaposed to conceal said fixed seat in an up-down direction, and, in the closed state, said lateral support plates are brought in an upright position and face each other in the left-right direction and a distance between said inboard plate edges of said lateral support plates is larger than a distance between said outboard plate edges of said lateral support plates.

2. The hinge of claim 1, wherein, in the open state, a rotating center of each of said rotary brackets is closer to a respective one of said lateral support plates than a rotating center of each of said inboard pinions and a rotating center of each of said outboard pinions.

3. The hinge of claim 2, wherein said fixed seat includes a fixed frame which has said two elongated sides, and a rail frame which is securely mounted on said fixed frame and which is formed with said two first guideways, said fixed frame defining a receiving space, wherein, said rotating centers of said inboard pinions and said rotating centers of said outboard pinions are located in said receiving space, and, in the open state, said rotating centers of said rotating brackets are located outwardly of said receiving space between said lateral support plates and said fixed frame in the up-down direction.

4. The hinge of claim 1, wherein rotating centers of said rotary brackets are located outboard of rotating centers of said two outboard pinions in the left-right direction.

5. The hinge of claim 1, wherein said bracket body of said rotary bracket has a pivot shaft which is pivotably mounted on said fixed seat, said bracket toothed portion being formed on said pivot shaft.

6. The hinge of claim 1, wherein, in the open state, said shell supporting surfaces of said sliding members are parallel to said plate supporting surfaces of said linking members, and, in the closed state, said shell supporting surfaces of said sliding members are disposed parallel to each other and opposite to each other in the left-right direction.

* * * * *